A. STURTEVANT.
AUTOMOBILE SIGNAL.
APPLICATION FILED NOV. 21, 1916.
1,237,120.
Patented Aug. 14, 1917.
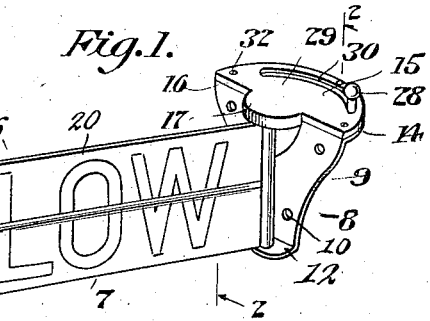
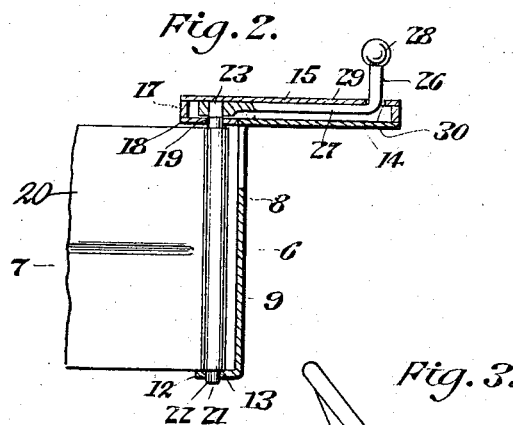
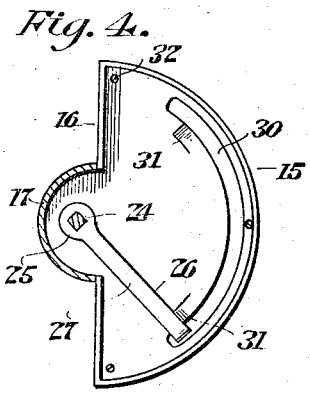
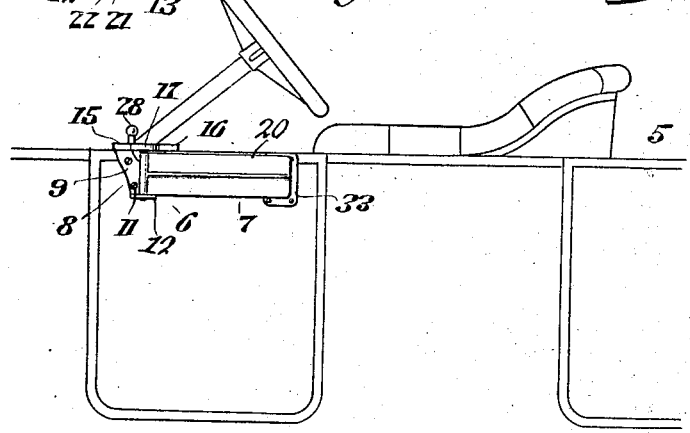
WITNESSES
INVENTOR
A. Sturtevant
BY Victor J. Evans
ATTORNEY

UNITED STATES PATENT OFFICE.

ARTHUR STURTEVANT, OF SANTA BARBARA, CALIFORNIA.

AUTOMOBILE-SIGNAL.

1,237,120.  Specification of Letters Patent. Patented Aug. 14, 1917.

Application filed November 21, 1916. Serial No. 132,657.

*To all whom it may concern:*

Be it known that I, ARTHUR STURTEVANT, a citizen of the United States, residing at Santa Barbara, in the county of Santa Barbara and State of California, have invented new and useful Improvements in Automobile-Signals, of which the following is a specification.

The present invention contemplates the production of an automobile signal of such construction to adapt its manipulation in a quick and easy manner, in order that the driver of the car ahead may give warning to the driver of the car in the rear that the machine bearing the signal is about to make a turn either to the right or to the left, the signal alarm being self-retaining in order that both hands of the operator may be free for operating the machine, and further during unfavorable weather conditions will not necessitate the operator extending his arm exteriorly of the car to indicate the direction of the travel of the car.

Furthermore, use is made of a novel type of bracket for supporting the signal arm on the motor vehicle, and the signal arm being so journaled to said bracket in order to permit its manipulation in not only a quick and simple manner, but to lock such signal arm in either an extended or closed position.

With the above and other objects in view, the invention consists in the novel features, details of construction and combination of parts which will hereinafter be more fully set forth, illustrated in the accompanying drawing and pointed out in the appended claims.

Figure 1 is a perspective view of the signal shown detached from a car;

Fig. 2 is a vertical section taken on line 2—2 of Fig. 1;

Fig. 3 is a side elevation of a portion of a car showing the signal attached thereto; and Fig. 4 is a bottom plan view of the cap plate showing the operating lever assembled thereon and the socket being shown in section.

Referring more particularly to the accompanying drawing, in which like characters of reference refer to corresponding parts in the several views, 5 indicates the body portion of a motor vehicle having mounted preferably on the front door thereof a direction signal, denoted generally by the character 6. The signal arm or indicator 7 of the signal is operatively supported on the car through the medium of a novel type of bracket 8. This bracket 8 is constructed of any suitable material and constituting a vertical supporting arm 9 provided with openings 10 through which extend suitable fasteners 11 for connecting the supporting arm of the bracket to the exterior or front face of the door of the motor vehicle. The extreme lower end of the supporting arm 9 is bent in a direction laterally to the outer face thereof to provide an angular lip 12 having a centrally located circular bearing opening 13. The opposite or upper end of the supporting arm is bent in a lateral direction from the opposite face thereof to provide an enlarged semi-circular base plate 14 adapted upon the operative position of the signal, to rest upon the upper edge of the door of the motor vehicle and extend inwardly of said door. This bracket 8 further embodies a hollow semi-cylindrical cap plate 15 constructed of metal or other suitable material and provided with a front straight edge 16, the material from which the cap plate is formed being extended laterally to provide on the front straight edge 16 of the cap plate a centrally located closed socket 17, having formed in the bottom wall 18 thereof a cylindrical bearing opening 19. Provided on the rear transverse edge of the indicating arm 20 of the signal is a shaft 21 having provided on its lower end a cylindrical trunnion 22, while provided on the upper end of the shaft is a squared trunnion 23, and as is apparent from the drawing, when the signal arm is mounted on the bracket, the circular trunnion 22 of the shaft is journaled in the bearing opening 13 of the lip 12 while the squared trunnion 23 of the shaft projects in the bearing opening 19 of the socket 17 and engages in a slot 24 formed in the head 25 of an operating handle 26. In order to allow of this connection of the shaft of the signal arm with the head 25 of the operating handle, it is obvious that the head extends within the socket 17 and owing to the hollow formation of the cap plate 15 will accommodate the arm 27 of the operating lever and allow the operator, upon grasping the knob 28, to move the operating lever in an arcuate path. This movement of the lever is caused by the provision in the top wall 29 of the cap plate of an arcuate slot 30. Formed integral with the inner face of the top wall 29 of said cap plate and flush with one of the walls forming the arcuate slot 30, and at the opposite extremities of said slot is a pair of beveled lugs 31, consequently upon movement of the knob 28 to one extreme end of the arcuate slot, the arm 27 of the operating lever will ride over one of the lugs 31 and cause the signal to be locked in an open position, while upon the movement of the knob 28 to the opposite extreme end of the arcuate slot, the arm 27 of said lever will engage over the opposite lug 31 and cause the signal to be locked in a closed position. Upon the normal position of the cap plate 15, the same reposes upon the base plate 14 of the bracket and is detachably connected therewith through the employment of suitable fasteners such as screws or the like, designated by the character 32. It is to be further stated in order to prevent the indicating arm from scratching or mutilating the door of the vehicle when the same assumes a closed position, use is made of a plate 33.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the appended claims.

What is claimed as new, is:

1. A vehicle signal embodying a supporting arm provided at one end with a lip extending laterally from one face of the supporting arm, a base plate provided on the opposite end of the supporting arm and extending in a lateral direction from the opposite face of said arm, a hollow cap plate provided with an arcuate slot and a socket formed with a bearing opening, means for detachably connecting the cap plate upon the base plate, an indicating arm provided with a shaft having a circular trunnion and a squared trunnion, the trunnions of said shaft being journaled for rotary movement in the bearing openings of said lip and socket, and means operatively connected to the squared trunnion of said shaft and operating in the arcuate slot of said cap plate for imparting movement to said indicating arm, and means formed on the inner face of the cap plate and at opposite extremities of said arcuate slot for retaining the indicating arm in either a locked extended or a locked closed position.

2. A vehicle signal comprising a supporting arm provided at one end with a lip extending laterally from one face of the supporting arm, a base plate provided on the opposite end of the supporting arm and extending in a lateral direction from the opposite face of said arm, a hollow cap plate provided with an arcuate slot and a socket formed with a bearing opening, means for detachably connecting the cap plate upon the base plate, an indicating arm provided with a shaft having a circular trunnion and a squared trunnion, the trunnions of said shaft being journaled for rotary movement in the bearing openings of said lip and socket, and means operatively connected to the squared trunnion of said shaft and operating in the arcuate slot of said cap plate for imparting movement to said indicating arm, and beveled lugs formed on the inner face of the cap plate and at opposite extremities of said arcuate slot for retaining the indicating arm in either a locked extended or a locked closed position.

In testimony whereof I affix my signature.

ARTHUR STURTEVANT.

Copies of this patent may be obtained for five cents each, by addressing the "Commissioner of Patents, Washington, D. C."